United States Patent
Morton

[11] Patent Number: 5,216,829
[45] Date of Patent: Jun. 8, 1993

[54] FISH BAIT

[76] Inventor: Peter Morton, 36 Douglas Close, Upton, Poole, Dorset BH16 5HE, England

[21] Appl. No.: 773,868
[22] PCT Filed: Apr. 23, 1990
[86] PCT No.: PCT/GB90/00620
§ 371 Date: Oct. 25, 1991
§ 102(e) Date: Oct. 25, 1991
[87] PCT Pub. No.: WO90/12500
PCT Pub. Date: Nov. 1, 1990

[30] Foreign Application Priority Data

Apr. 27, 1989 [GB] United Kingdom ............ 8909675

[51] Int. Cl.$^5$ .................. A01K 85/01; A01K 97/02
[52] U.S. Cl. .................. 43/42.06; 43/44.99; 426/1
[58] Field of Search .......... 43/44.99, 42.06, 41, 43/42.05, 42.25, 42, 44.99; 452/30; 426/1, 135, 138, 140

[56] References Cited

U.S. PATENT DOCUMENTS

| | | | |
|---|---|---|---|
| 1,994,468 | 3/1935 | Freeman | 452/30 |
| 2,997,160 | 8/1961 | Marshall, Jr. | 43/44.99 |
| 3,950,255 | 4/1976 | Ishii et al. | 210/500.43 |
| 4,688,299 | 8/1987 | Frey et al. | 452/33 |
| 4,809,455 | 3/1989 | Smart | 43/41 |

FOREIGN PATENT DOCUMENTS

| | | | |
|---|---|---|---|
| 1149665 | 7/1983 | Canada. | |
| 2559086 | 7/1977 | Fed. Rep. of Germany | 452/30 |
| 2508276 | 12/1982 | France | 452/30 |
| 3-43034 | 2/1991 | Japan | 43/42 |
| WO83/00984 | 3/1983 | PCT Int'l Appl. | 43/42.24 |
| WO-86/06251 | 11/1986 | PCT Int'l Appl. . | |

Primary Examiner—Richard K. Seidel
Assistant Examiner—Jeanne M. Elpel
Attorney, Agent, or Firm—Sughrue, Mion, Zinn, Macpeak & Seas

[57] ABSTRACT

A fish bait intended mainly for use in long line fishing is constituted by a natural bait material, such as fish, squid, shellfish, fish offal, dehydrated or freeze dried fish meal and/or fish oil (3) enclosed in a porous casing (1,2). The casing, which surrounds the entire bait, is made of a layer of semi-permeable membrane (1) and a layer of mesh reinforcement (2). The membrane preferably is a collagen based material which allows fish oil and aroma constituents of the natural bait (3) to permeate into the surrounding water to attract fish. The reinforcing mesh, which preferably is made from a knitted cotton tubular bandage material, provides stability for the bait package, and ensures that the bait package is retained on a hook (5).

10 Claims, 4 Drawing Sheets

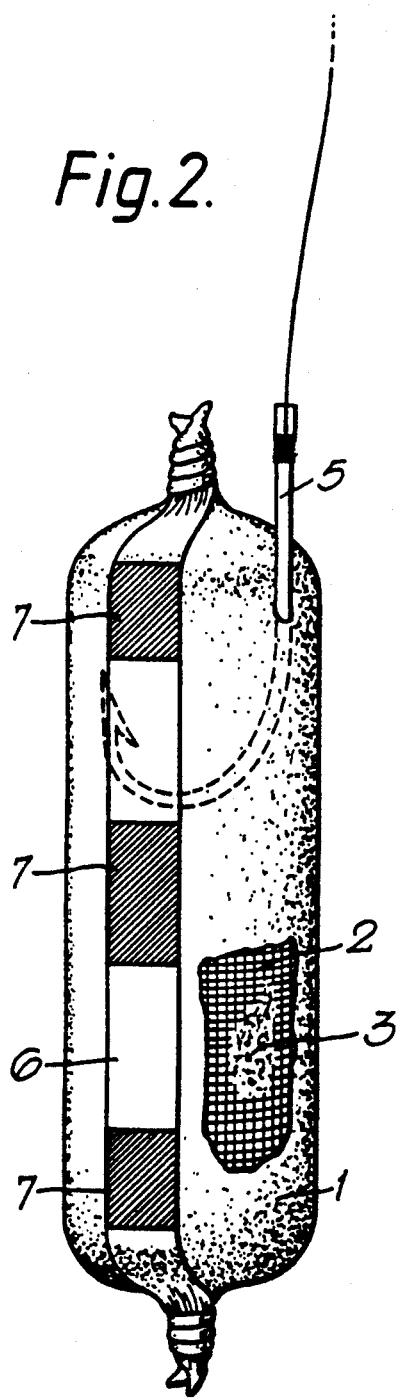
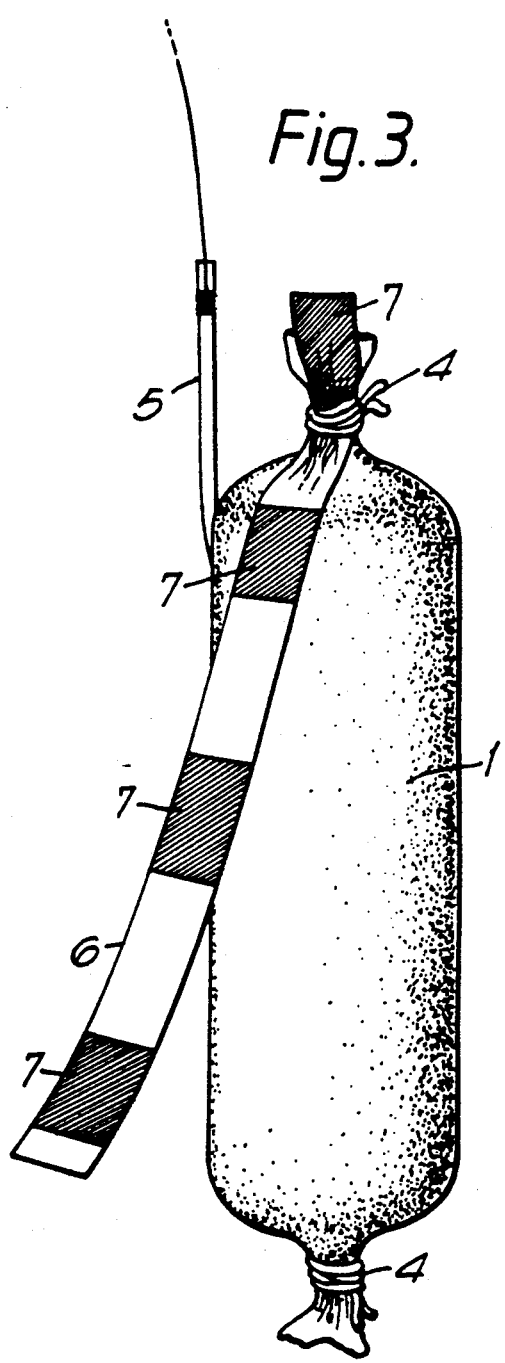
Fig. 2.
Fig. 3.

FISH BAIT

Long line fishing is a method of commercial fishing in which long lines having several thousand traces each with a baited hook attached to them are left suspended in the sea. The long lines are subsequently reeled in together with any fish that have been caught. One of the chief influences on the success of this type of fishing is the quality of the bait both in the sense of its attractiveness to fish and in the sense of its remaining on the hook and remaining in an attractive condition to the fish throughout the fishing period during which the long line is deployed Traditionally the bait is formed by portions of or complete fish, squid or shellfish. This type of fishing is reliant upon having a continuity of supply of bait and, at least to some extent this is seasonal. Freezing the bait has helped to alleviate the seasonal supply problem but fish, when frozen and subsequently thawed, tends to deteriorate in texture making its attachment to the hooks difficult and unreliable.

Very many proposals have been made previously to produce artificial baits and overcome the limitations of using natural baits such as fish, squid and shellfish. U.S. Pat. No. 3,835,572, U.S. Pat. No. 3,969,840 and U.S. Pat. No. 4,133,134 all disclose the use of a refillable foraminous metal container which is filled with a mixture of minced natural bait which may be mixed with additional fish attractants. U.S. Pat. No. 2,555,088; U.S. Pat. No. 2,780,021; U.S. Pat. No. 2,869,279; U.S. Pat. No. 3,047,975; U.S. Pat. No. 3,958,357; GB-A-2124864; CA-A-1152745 and WO-A-86/06251 all disclose a bait package consisting of a bag made from a woven cloth material, waterproof porous paper or non-porous but apertured plastics material which is filled with a mixture of minced natural bait which may be mixed with additional fish attractants. Finally CA-A-1149665 discloses the use of an entirely oil-free chemical artificial bait including ammonium ions which is contained in a refillable apertured metal container or in a disposable pack most of which is non-porous but which includes a window covered by a plastics mesh and lined internally with a water permeable membrane through which the ammonium ions permeate to attract fish.

According to this invention a fish bait comprising a natural bait material enclosed in a porous casing is characterized in that the casing surrounding the entire bait is made of a layer of semi-permeable membrane and a layer of a mesh reinforcement.

The natural bait material may be whole fish, squid, shellfish, fish offal, or dehydrated or freeze dried fish meal or more usually a mixture of these. The bait may be chopped or minced, but preferably it is homogenized and includes fish extracts such as concentrated liver oil or a synthesized formulation with similar characteristics. Preferably the homogenized bait also includes salt which acts with the proteinaceous material to form a gel. Such bait is contained by the casing in a stable form and the combination of the reinforcing mesh providing some structural strength for the bait package and ensuring the retention of the bait by the hook together with the semi-permeable membrane which protects the natural bait material whilst allowing the natural or synthetic oils and the aroma of the bait to permeate through it into the sea to attract fish to the bait is a particularly effective casing for fish bait.

Colouring, reflective or fluorescent material may be added to the bait, or to the casing to act as a further enhancement of the bait. The colouring, reflective or fluorescent material may have the form of a printed or painted plastics or paper strip attached to the outside of the bait or contained in the bait preferably between the semi-permeable membrane and the reinforcing mesh. Alternatively the outside of the casing may be painted or dyed with such material to provide at least one area of of contrast with the remainder of the bait package which acts to attract fish to the bait. The bait may also include an additional lure. The hook may be included as part of the bait during its formation or the bait may be applied to the hook in the normal way by hand or by automatic baiting machinery.

The reinforcing mesh may be formed integrally with the semi-permeable membrane, for example, when the semi-permeable membrane is formed by an extrusion process it may be extruded around the reinforcing mesh or, alternatively, the reinforcing mesh and semi-permeable membrane may be formed separately and both merely wrapped around the bait. Preferably the semi-permeable membrane is wrapped around the outside of and encloses the reinforcing mesh.

Preferably the casing is formed as a continuous cylindrical tube which is filled with the bait material in a generally similar way to that in which sausages are made. In this case the extruded sausage-like product is divided into discrete portions by tying, twisting, or heat sealing. The product may be formed into discrete portions by tying a pair of strings tightly around the outer casing and then cutting the outer casing between the pair of tying strings. Alternatively the casings may be formed as an envelope or pouch, typically by joining together flat sheets to form a number of separate discrete pouches with the bait material enclosed in each pouch. The sheets may be joined by heat sealing, gluing, stitching or stapling.

The semi-permeable membrane may be formed by a synthetic micro-porous plastics material. Preferably, however, it is formed by conventional material from which edible sausage skins are made or by a natural gut material. The conventional material from which edible sausage skins are made is collagen, a proteinaceous material derived from animal connective tissue. When the bait material has been homogenized and formed into a gel it is especially preferred that the semi-permeable membrane is formed from collagen since this is proteinaceous and bonds to the gel. This enables a stable bait package to be formed merely by twisting the casing between adjacent bait packages and subsequently cutting through the twisted join to separate the bait into individual packages.

The reinforcing mesh is preferably a loosely woven or knitted natural or synthetic yarn or a woven or moulded net material. It can have a coarse texture since it does not have to contain the homogenized bait material, it merely acts as a reinforcement for the bait package and to provide a matrix to which the hook can be attached. A knitted cotton tubular bandage material has been found to be particularly suitable.

As well as being used to bait long line hooks the bait in accordance with this invention can be used as bait in any type of fishing in either sea or fresh water by either a commercial or leisure user and it may also be used as bait in lobster and crab pots or in any other type of trap used to catch fish, eels, crustacea, shellfish or water dwelling mammals.

The bait in accordance with this invention remains on the hook consistently as a result of the reinforcing mesh and remains effective for a long period of time as the fish oils or other odor producing agents contained within the bait are metered out slowly through the semi-permeable membrane. The bait is very much cleaner and easier to use than pieces of raw fish, for example, and because it can be made to a standard uniform size multi-hook line deployment particularly using an automatic baiting machine is more efficient with less tendency to tangle and foul-up. With the hook embedded in the bait in accordance with this invention a more positive hooking of fish takes place since the hook tends to be swallowed completely with the bait and then catches in the gut of the fish rendering it impossible for the fish to reject it. The bait in accordance with this invention is not as critical to temperature change during storage and can be readily frozen to keep it fresh, unfrozen before use and even refrozen. Irrespective of the texture of the bait inside the package the mesh reinforcement provides structural stability which keeps the bait on the hook and so its hook retention properties are not impaired by a freezing and subsequent thawing step. Furthermore, the semi-permeable membrane protects the bait material inside and tends to slow down its decomposition.

Particular examples of bait in accordance with this invention will now be described with reference to the accompanying drawings in which:

FIG. 2 is a partly cut away perspective view of the first example of finished bait;

FIG. 3 is a perspective view of a modification of the first example of finished bait;

Figure 1A:
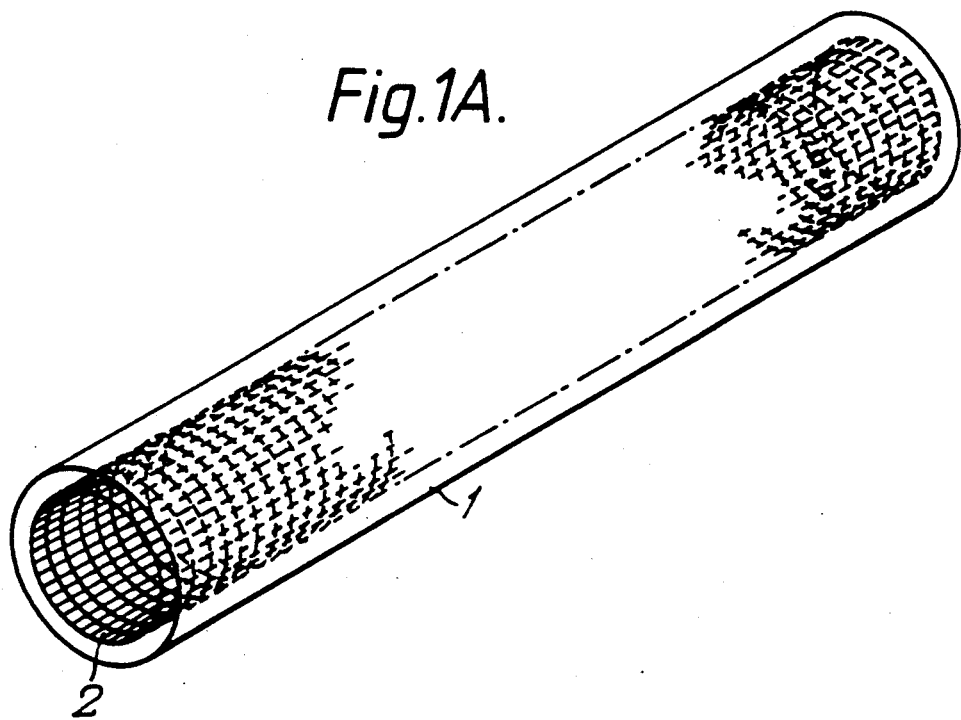
FIG. 1A is a perspective view of the tubular casing of a first example.

A first example of bait in accordance with this invention is generally cylindrical and comprises an outer semi-permeable membrane 1 formed from a collagen based material used for the edible skins of sausages and sold under the the trade name COLOGEN (Trade Mark of Devro Limited) surrounding an inner cotton knitted reinforcing mesh such as that sold under the trade name of TUBIGAUZE (Registered Trade Mark) tubular bandage material. The casing formed by the membrane 1 and reinforcing mesh 2 is filled with an homogenized natural bait material prepared by and filled into the casing using conventional sausage making machinery. The natural bait material 3 is typically made by a mixture of fresh, dehydrated, or frozen fish such as sardines, fish meal and sardine oil mixed and ground together in a bowl cutter with salt until it has the form of an homogenous gel. The salt together with a proteinaceous material in the mixture provides this gel like structure. The homogenous mixture is then extruded through a conventional sausage casing filling nozzle into the inside of the reinforcing mesh 2. The gel tends to bond to the collagen membrane 1 since this is also proteinaceous in nature so sandwiching the cotton reinforcing mesh 2 between the filling 3 and the membrane 1 which enhances the stability of the finished package. Typically a continuous length of bait "sausage" is produced typically some ten meters or more in length and this is then divided into separate bait portions by twisting the sausage into a number of separate links in a similar fashion to the way in which conventional sausages are produced and then cutting through the twisted join. Again the bonding that takes place between the outer membrane 1 and the filling 3 typically provides a sufficient closure for each bait portion to retain the filling 3 inside the casing 1 and 2. However, if required the continuous bait "sausage" may be divided into individual portions by tying pairs of strings or clips around the outside of the casing at predetermined intervals and then cutting the casing between adjacent pairs of strings 4 to provide individual bait packages tied at both ends as shown in FIG. 3.

FIG. 2 shows the completed bait package attached to and suspended from a hook 5. A strip 6 of paper, plastics or metal foil is preferably incorporated into each bait package. The strip is preferably marked with markings 7 to provide a contrast to the remainder of the bait package which acts as a fish attractant. The markings may be provided by coloring, reflective or fluorescent marks. As an alternative, the coloring, reflective or fluorescent marking may be applied directly to the membrane 1 and vegetable dyes, in particular, are useful for this purpose. The strip 6 may be interposed between the membrane 1 and the reinforcing mesh 2 provided the membrane 1 is sufficiently transparent or translucent for the markings on the strip to be visible from outside the bait package. Alternatively, especially when the bait package includes strings 4 at both ends the strip 6 may be held beneath one or both of the strings 4, as shown in FIG. 3.

Figure 4:
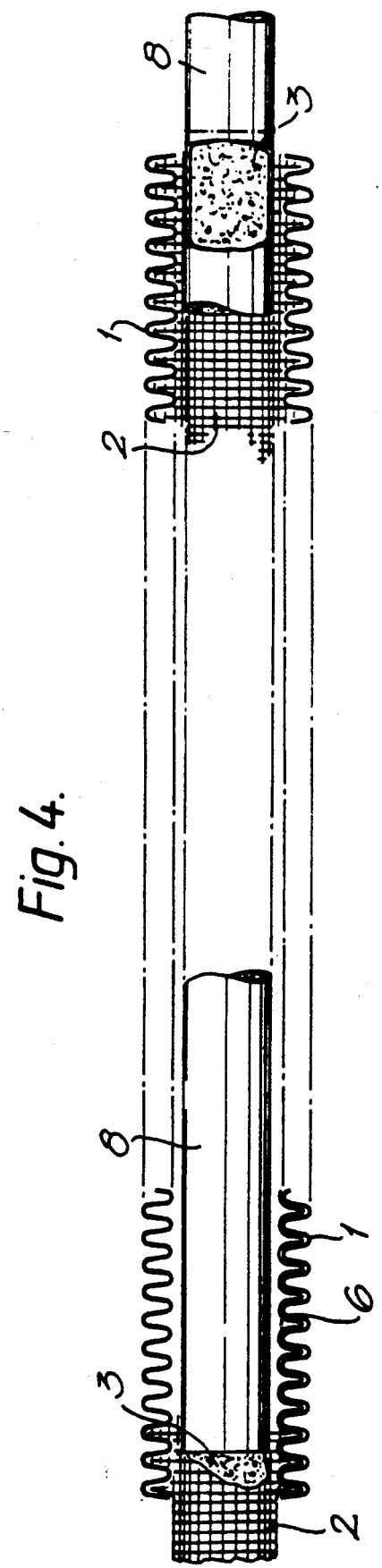
FIG. 4 is a diagram of the casing before filling.

FIG. 4 illustrates a typical casing assembly of membrane 1 and reinforcing mesh 2 packaged onto a former 8 consisting of a concertinaed length of reinforcing mesh 2 with a slug of membrane 1 at its leading end. When the strip 6 is incorporated between the membrane 1 and reinforcing mesh 2 preferably it is pleated into a zig-zag form and concertinaed with the reinforcing mesh 2 on the former 8. In use, the concertinaed arrangement of reinforcing mesh 2 together with the slug 9 of membrane 1 is slid from the former 8 onto the nozzle of a conventional sausage filling machine and then, as the bait material 3 is extruded into the middle of the reinforcing mesh 2 the membrane 1 is stretched over the outside of the reinforcing mesh 2 as this is filled and extended.

Figure 1B:
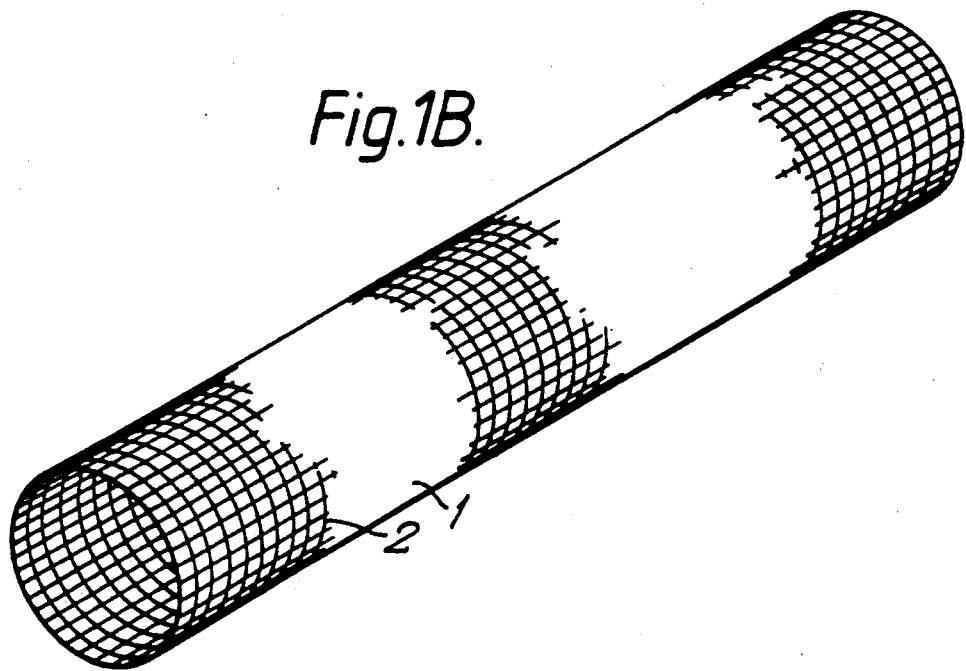
FIG. 1B is a perspective view of the tubular casing of a second example with internal reinforcement.

FIG. 1b illustrates a second example of casing in accordance with this invention in which the reinforcing mesh 2 is formed integrally with the membrane 1 in an extrusion process.

Figure 5:
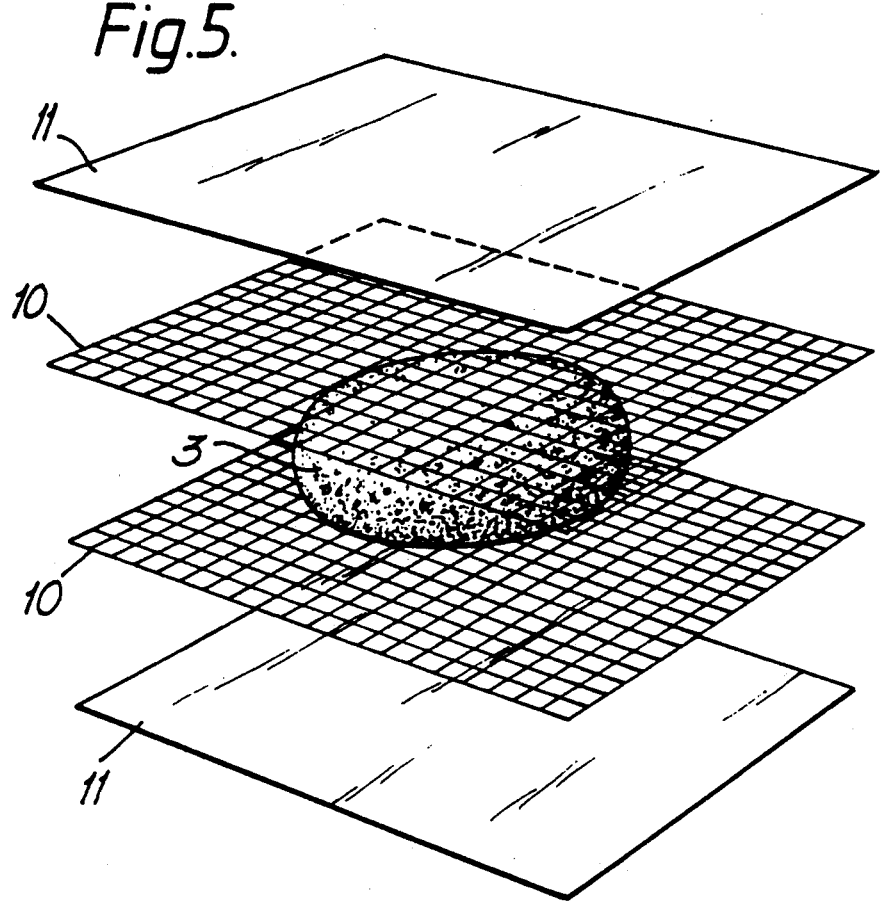
FIG. 5 is an exploded perspective view of a third example of the casing in sheet form; and, FIG. 6 is an exploded perspective view of a fourth example of the casing in sheet form with integral reinforcement.
Figure 6:
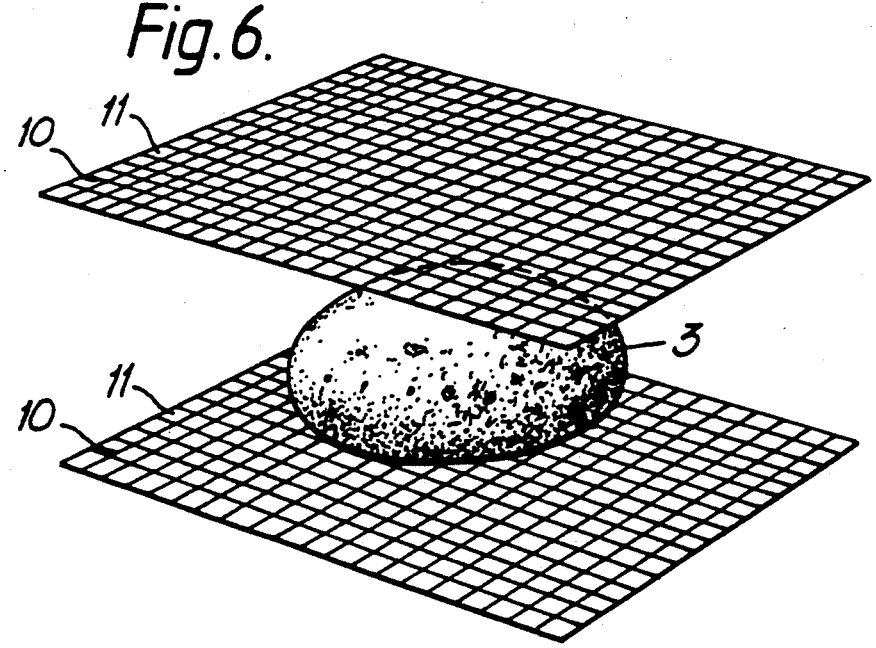

In an alternative arrangement illustrated in FIGS. 5 and 6 the casing has the form of a generally rectangular pouch. In this example the bait material 3 is sandwiched between opposed layers 10 of reinforcing mesh which are in turn enclosed by opposing sheets 11 of semi-permeable membrane material. The sheets 6 and 7 are brought together to form a laminate and heat sealed or stitched around their edges to enclose the bait material 3. The layers 10 and 11 may be made from the same materials as the casing layers 1 and 2 described with reference to the first and second examples or, alternatively, they may be made from plastics material to facilitate the heat sealing of their edges.

FIG. 6 shows a modification of the arrangement shown in FIG. 5 where the reinforcing mesh 2 is formed integrally with the semi-permeable membrane 11 in a fashion analogous to that illustrated in FIG. 1b.

I claim:

1. A fish bait comprising:
   a natural bait material (3) including one of more materials selected from the group consisting of whole fish, fish extracts, squid, shellfish, fish offal, dehydrated fish meal, and freeze dried fish meal;
   a porous casing (1,2) enclosing said natural bait material so as surround the entire bait, said casing comprising a layer of semi-permeable membrane (1) and a layer of mesh reinforcement (2).

2. Fish bait according to claim 1, further comprising material which is colored, reflective or fluorescent, said material being added to one of the bait (3), or to the casing (1,2).

3. Fish bait according to claim 2, wherein said material comprises a strip (6) inside, or attached to the outside, of the casing (1,2).

4. Fish bait according to claim 1, wherein the natural bait material further includes a synthesized formulation having characteristics similar to said fish extracts.

5. Fish bait according to claims 1, 2, 3 or 4, which also includes a lure (6).

6. Fish bait according to claims 1, 2, 3 or 4, which also includes a hook (5).

7. Fish bait according to claims 1, 2, 3 or 4, in which the casing (1,2) is formed from a continuous cylindrical tube of semi-permeable membrane (1) and mesh reinforcement (2).

8. Fish bait according to claims 1, 2, 3 or 4, in which the natural bait material (3) has the form of an homogenized gel which bonds to the semi-permeable membrane (1).

9. Fish bait according to claims 1, 2, 3 or 4, in which the semi-permeable membrane (1) is a collagen based material.

10. Fish bait according to claim 7, wherein the bait comprises discrete portions which are formed by twisting, tying, or heat sealing the cylindrical casing.

* * * * *